UNITED STATES PATENT OFFICE.

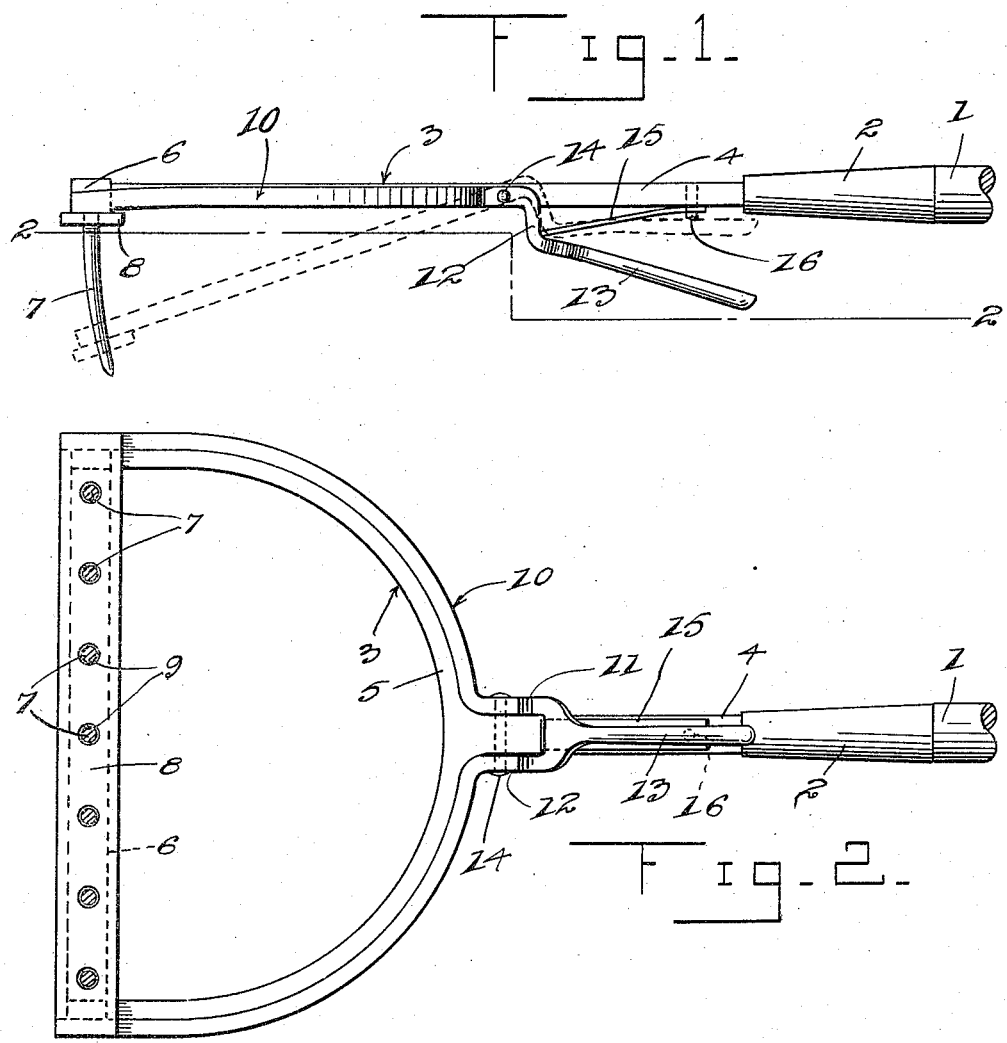

HERMAN F. ROEHRIG, OF NIAGARA FALLS, NEW YORK, ASSIGNOR OF ONE-HALF TO ALBERT S. RUTH, OF NIAGARA FALLS, NEW YORK.

SELF-CLEANING RAKE.

1,173,867. Specification of Letters Patent. Patented Feb. 29, 1916.

Application filed February 25, 1914. Serial No. 820,878.

*To all whom it may concern:*

Be it known that I, HERMAN F. ROEHRIG, a citizen of the United States, residing at Niagara Falls, in the county of Niagara and State of New York, have invented certain new and useful Improvements in Self-Cleaning Rakes; and I do hereby declare the following to be a full, clear, and exact description of the invention, such as will enable others skilled in the art to which it appertains to make and use the same.

This invention relates to new and useful improvements in rake cleaners, and has for its principal object to provide a simple and effective means by which the teeth of a rake may be stripped of any foreign matter or trash which may have gathered thereon.

Another object of the invention is to provide a stripping device which will automatically return to its raised position and leave the teeth in condition for use.

Still another object of the invention is the provision of a novel combination and arrangement of parts by means of which the above-mentioned results may be attained which will be particularly simple in operation, easy to manufacture and cheap in construction.

With these and other objects in view, the invention consists in the novel combination and arrangement of parts which will be fully set forth in the following specification and accompanying drawings, in which, Figure 1 is a side view in elevation of a rake constructed in accordance with this invention, and Fig. 2 is a detail plan view of the same.

Referring now to the drawings by characters of reference, the numeral 1 designates the handle of a rake having secured at one end thereof, the usual ferrule indicated by the numeral 2. A suitable head designated generally by the numeral 3 is secured to the handle in the ordinary manner, more fully described hereinafter.

The rake head above referred to preferably comprises the shank 4 which terminates in its forward end in the U-shaped member designated by the numeral 5. To the free ends of the arms of the U-shaped member 5 is preferably secured the bar 6 as clearly illustrated in Fig. 1. This bar 6 is provided with the usual teeth 7 which extend downwardly therefrom and are curved to permit the stripping bar, which will be more fully hereinafter described, to slide freely thereover.

The stripping bar above referred to, is designated by the numeral 8 and is provided with a plurality of apertures 9 which are slidable over the rake teeth as illustrated in the figures. To each end of the stripping bar is secured the free end of each of the arms of the U-shaped member designated generally by the numeral 10, the bight portion of which terminates in the off-set U-shaped portion 11 which extends downwardly as at 12. This downward extension 12 has formed integral therewith the hand grip 13 by means of which the device is actuated. A suitable pivot 14 extends through an aperture in the shank 4 and through a pair of apertures in the U-shaped member 11 and thus pivotally secures the whole in place on the rake, when the device is in use. A leaf spring 15 is secured to the shank 4 as at 16 and is adapted to exert pressure against the bight portion of the U-shaped member 11 to normally hold the stripping bar through the medium of the U-shaped member 10 in its raised position.

It will be apparent from the foregoing, that in use the rake is used in the ordinary manner, and when the teeth become clogged or filled with trash or the like, it will be apparent that by gripping the handle portion and forcing the same toward the handle of the rake, that the stripping bar will be caused to descend toward the ends of the rake teeth, and thereby force the trash therefrom. Owing to the action of the spring 15, it will be evident that the stripping bar will automatically return to its normal raised position soon as the tension on the handle is released.

While in the foregoing there has been shown and described the preferred embodiment of this invention, it is to be understood that such changes may be made in the combination and arrangement of parts as will fall within the scope and spirit of the appended claim.

Having thus described my invention, I claim:

A rake and cleaner therefor comprising a handle, a U-shaped head, a shank secured to the bight portion of the head and to the forward end of the handle, a bar secured to the free ends of the head, teeth secured to the bar, a plate located on the under side of the shank, a pair of relatively spaced arms secured to the plates and projecting forwardly therefrom, and located on opposite sides of the shank, said arms extending upwardly, a pair of curved arms inclosing said U-shaped head, and provided at one of their ends with inwardly extending relatively spaced pivot lugs, their free ends being secured to the upper terminals of the arms, said pivot lugs provided with openings therethrough, a pivot bolt passing through the lugs and the shank, a handle secured to the rear edge of the plate, a stripping bar slidably mounted over the teeth and secured to the free ends of the curved arms, a flat spring secured at one end thereof to the shank at a point adjacent to its connection with the handle, its opposite end extending forwardly and resting upon the plate whereby upon upward movement of the handle of the plate the curved arms will be brought downwardly, and said stripping bar brought into operation.

In testimony whereof I affix my signature in presence of two witnesses.

HERMAN F. ROEHRIG.

Witnesses:
ALBERT S. RUTH,
JOSEF KINS.

Copies of this patent may be obtained for five cents each, by addressing the "Commissioner of Patents, Washington, D. C."